United States Patent
Fägerhag et al.

(10) Patent No.: US 6,637,772 B1
(45) Date of Patent: Oct. 28, 2003

(54) METHOD AND DEVICE FOR A SAFETY BELT

(75) Inventors: Mats Fägerhag, Trollhättan (SE); Alf Hedlund, Trollhättan (SE); Kristina Wiklund, Trollhättan (SE); David C. Viano, Bloomfield Hills, MI (US)

(73) Assignee: Saab Automobile AB (SE)

( * ) Notice: Subject to any disclaimer, the term of this patent is extended or adjusted under 35 U.S.C. 154(b) by 0 days.

(21) Appl. No.: 09/700,584

(22) PCT Filed: May 19, 1999

(86) PCT No.: PCT/SE99/00852
§ 371 (c)(1),
(2), (4) Date: Jan. 30, 2001

(87) PCT Pub. No.: WO99/59848
PCT Pub. Date: Nov. 25, 1999

(30) Foreign Application Priority Data

May 20, 1998 (SE) .............................................. 9801786

(51) Int. Cl.⁷ .............................................. B60R 22/46
(52) U.S. Cl. ....................................... 280/806; 297/480
(58) Field of Search ................................ 280/806, 805; 180/268; 297/470, 476, 477, 478, 479, 480

(56) References Cited

U.S. PATENT DOCUMENTS

| | | | |
|---|---|---|---|
| 5,552,986 A | 9/1996 | Omura et al. | 280/806 |
| 5,558,370 A | 9/1996 | Behr | 280/806 |

FOREIGN PATENT DOCUMENTS

| | | |
|---|---|---|
| DE | 2227121 | 1/1974 |
| DE | 4332205 | 3/1995 |
| DE | 19520721 | 12/1996 |

OTHER PUBLICATIONS

English Abstract of DE 19520721, Dec. 1996.*

* cited by examiner

*Primary Examiner*—Eric Culbreth
(74) *Attorney, Agent, or Firm*—Ostrolenk, Faber, Gerb & Soffen, LLP

(57) ABSTRACT

For a safety belt (2) in a vehicle, the belt is tightened in the event of a collision for at least 300 ms, at the same time as the maximum pull on the safety belt is limited to a predetermined value during the whole tightening process. This is made possible by a tightening device (15) being arranged to be able to operate for at least 300 ms and by there being a load-limiting device (14) between the tightening device (15) and the belt.

27 Claims, 1 Drawing Sheet

METHOD AND DEVICE FOR A SAFETY BELT

TECHNICAL FIELD

This invention relates to a method of restraining a belt wearer in a vehicle in the event of a collision by means of a safety belt. The invention also relates to a device for such a safety belt.

PRIOR ART

By the use of safety belts, normally of the three-point type, personal injuries resulting from frontal collisions have been reduced. With the aim of reducing the risk of injury still further, it has become common to ensure that the safety belt tightens at the moment of impact, so that the wearer is not thrown with unnecessary force against a slack safety belt. This is achieved by means of a belt tensions being activated when the retardation of the vehicle reaches a predetermined value, normally about 5 g. Such belt tensions are usually mounted at the side of the person, where the shoulder strap and the lap strap meet at the belt fastener, and provide primarily a tightening of the lap strap, but also of the shoulder strap. In other embodiments the belt tensions acts upon the top end of the shoulder strap and thereby provides greatest tightening of the shoulder strap, while the tightening of the lap strap is less.

However, experience has shown that in spite of these measures, in the event of a collision, the contact with the shoulder strap can cause chest injuries, particularly in elderly persons. The safety belt protects the wearer from hitting the vehicle, but the wearer can still be injured by the safety belt itself. With the aim of reducing this type of risk of injury, tests have been carried out of different ways of limiting the load on safety belts. For example, one solution has been to use thinner webbing near the upper fixing point so that the safety belt will yield somewhat at a certain load. With the same aim the belt roller can be mounted at a fixing point which yields at a certain load. Another solution is that the belt roller is connected with a friction coupling which can be set to absorb various degrees of load.

Common to all of these known solutions is the fact that the upper body of the belt wearer is allowed to move forwards an appreciable amount during the extending of the safety belt. The stresses on the belt wearer are reduced, but it would be desirable to be able to reduce the stresses and thereby the risk of injury to the belt wearer still further.

AIM OF THE INVENTION

The aim of the invention is to further reduce the risk of injury to a belt wearer in the event of a collision. A further aim is to achieve this in a simple and reliable way using simple means.

DESCRIPTION OF THE INVENTION

According to the invention, by means of tightening the safety belt for at least 300 ms and during this time limiting the maximum pull on the safety belt to a predetermined value, an effective yet gentle restraint of the belt wearer is achieved. The tightening can advantageously continue for 800 ms or more in order to ensure good restraint during a relatively long-lasting collision.

A device according to the invention is so constructed that the tightening device can operate for at least 300 ms and in addition the load-limiting device is arranged to operate between the spooling device and the tightening device. By this means tightening can take place continuously with simultaneous load limitation, so that the belt wearer is restrained gently and effectively.

According to a particularly advantageous variant of the invention, the tightening is carried out in a part of the safety belt which passes over the shoulder of the belt wearer.

The restraining of the belt wearer can be improved still further according to the invention by means or commencing the tightening with a certain pre-warning before the collision.

Further characteristics and advantages are evident in the following description and patent claims.

DESCRIPTION OF THE FIGURES

In the following, an embodiment of the invention will be described in greater detail and with reference to the attached figures, where.

Figure 1:
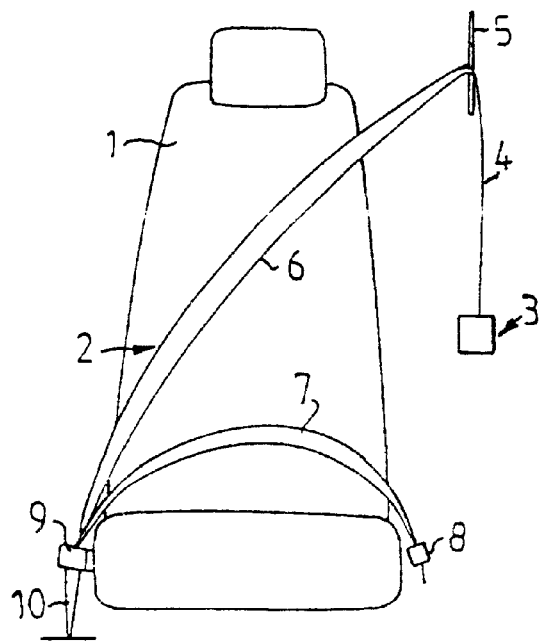
FIG. 1 shows, in a view from the front, a safety belt for a vehicle seat.

In a motor vehicle (not shown) there is according to FIG. 1 a safety belt 2 of the three-point type for a vehicle seat 1. From a spooling device 3 attached to the vehicle, the belt extends from a first end 4 over a shoulder-fixing 5 attached to the vehicle, which is normally adjustable to suit the size of the belt wearer, and forms first a shoulder strap 6 and then a lap strap 7. The free end of the lap strap 7 is fastened to a fixing 8 in the vehicle. At the transition between the shoulder strap 6 and lap strap 7 the safety belt can be fastened in a catch 10 in the vehicle using a belt fastener 9 in which the belt can slide freely.

The spooling device 3 is of the conventional type which in normal use operates with a spring permitting the shoulder strap 6 to be pulled out in order to give the wearer freedom of movement, but which in the event of a heavy load, for example in the event of a collision, prevents the shoulder strap 6 from being pulled out.

Figure 2:
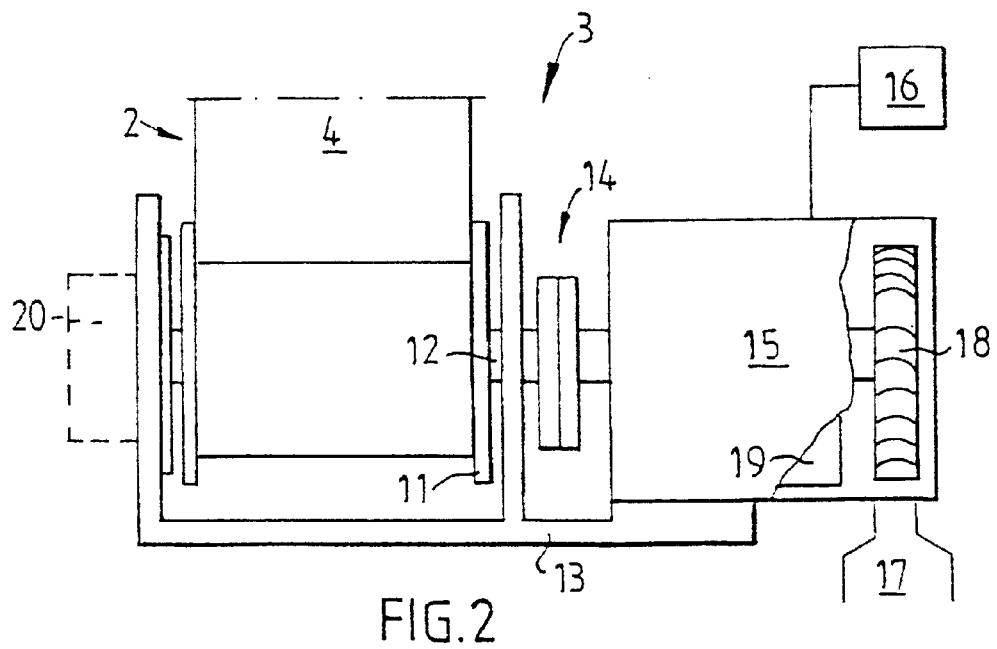
FIG. 2 shows a spooling device attached to the safety belt shown in FIG. 1, with associated tightening device and load-limiting device according to the invention.

As is shown in detail in FIG. 2, the spooling device 3 comprises a spool 11 with a spindle 12 which is mounted in a framework 13. The spindle 12 is connected via a load-limiting device 14 to a tightening device 15 or belt tensions which is arranged to be activated in the event of a collision in order thereby to tighten the safety belt and eliminate any slack in the belt. The tightening device 15 can suitably be activated when the retardation of the vehicle reaches a predetermined value, for example about 5 g. This can, for example, be carried out using a sensor 16 connected to the tightening device 15 where an accelerometer detects the retardation.

Normally, a tightening device 15 only operates for a brief initial phase of a collision, normally about 20 ms. According to the invention, however, the tightening device 15 is designed and arranged to operate for a considerably longer part of the time of the collision. Depending upon the force of the collision, consisting of a function of, for instance, the vehicle's speed and mass, the duration of the collision can be at least 300 ms and right up to 800 ms, or even longer. The tightening device 15 should therefore be able to be in operation for at least 300 ms, preferably for up to 800 ms or longer, i.e. in principle for the whole duration of the collision.

In the event of a collision the course of events according to the invention is as follows:

Within about 10 ms the vehicle's retardation has reached such a value that the tightening device 15 is activated. As a result the belt is tightened, so that any slack in the belt is eliminated and so that the belt wearer is well restrained in the seat. Depending upon the speed and strength of the tightening device 15 there can be a large pull generated on the safety belt with an associated danger of injuring the wearer. In order to reduce this risk of injury and limit the maximum permitted, and maximum possible pull on the safety belt, there is a load-limiting device 14 which causes the tightening device 15 to slip relative to the spool 11 in the event of strong tightening or to slip if the belt is pulled out with too great a force in the event of a severe collision.

After an initial tightening there is a situation during a collision where the wearer is thrown forwards against the shoulder strap 6 and puts a strain on this, possibly so much that the load-limiting device 14 yields or slips. As soon as the slipping ceases the tightening device 15 can reel the belt in again and thereby move the wearer back in the direction of the seat with the intended force. By this means the load on the wearer is more even and of a longer duration, resulting in a more effective and gentle absorption of the collision energy.

A great advantage of the continual stretching and tightening of the belt is also the fact that following the stretching of the belt after the first impact against the belt, the wearer comes into a more favourable position ready for any further impacts against the belt as a result of further secondary collisions. In addition, the improved position in the seat resulting from this reduces the risk of the upper body being thrown to the side and injured as a result.

Thus according to the invention the safety belt 2 is subject to a pulling resistance during most of the duration of the collision, which makes possible a gentle yet effective restraint of the wearer.

The maximum permitted pull on the safety belt is suitably in the range 2.0–3.5 kN. At this level the tightening of the belt can take place at a speed of 5–10 m/s in order to restrain the wearer. The belt tightening can need to amount to about 140–250 mm in order to achieve the desired effect, or even as much as 300–500 mm.

By combining a relatively low maximum pull on the safety belt with tightening which is quick and powerful while being, at the same time, of long duration, it is possible to protect the wearer from injuries in a more effective way than was previously possible.

The tightening device 15 can, according to FIG. 2, be equipped with a gas generator 17 which when activated can propel gas towards a turbine wheel 18 and thereby rotate the spool 11, and should as stated be able to be in operation for a relatively long period of time, perhaps up to 1000 ms or possibly several seconds. This can, for example, be achieved if the gas accumulator 17 is made sufficiently large to permit operation for such a long period of time. Another possibility is to combine gas operation and electrical operation. In this case the actual start can take place quickly with gas operation, for example by pyrotechnics, and then continued operation can take place by means of an electric motor 19 which is driven from the vehicle's electrical system via, for example, a capacitor. The electric motor and the gas motor can have a common spindle and form a single unit.

The load-limiting device 14 can advantageously consist of a friction connection which can possibly have an adjustable contact in order to enable changes to be carried out to the size of the transferred torque, for example as a function of the wearer's size and weight. It is possible, for example, to have a weight sensor in the seat controlling the friction connection.

In the example shown the spool 11 has a horizontal spindle, but it is of course also possible to orient the spindle another way, for example vertically, and in this way to utilize suitable controls in order to obtain the desired movement of the safety belt.

In the embodiment above the tightening does not commence until during the collision. It is, however, possible, according to the invention, to improve the restraining of the belt wearer further by bringing about a preparatory tightening of the safety belt before the collision process described above has begun, at an early stage in a situation which it is feared could develop into a crash situation. This solution requires the driving situation to be analyzed in order to provide the basis for an early activation of the tightening. Such a driving situation could be, for example, harsh braking or other situation where the distance to an object in front of the car reduces in a dangerous way.

For braking, the retardation can be recorded by means of an accelerometer, for example in the sensor 16, and when the value has reached a predetermined safety level, which is lower than the predetermined collision level, the tightening can begin as a preparation for the collision process. The warning time should in this case amount to 50–100 ms or more, for which reason the safety level of the retardation should be selected so that a sufficiently long warning time is obtained. This warning time enables the tightening device to start relatively slowly, which is advantageous when an electric motor 19 is used for operating the tightening device.

In a corresponding way, a distance radar, suitably in the sensor 16, can, for example, be used to monitor the distance to an object in front of the vehicle and to activate the tightening device when the distance has reduced to a critical value, or reduces at a critical rate. Also in this case a warning time of the said length is desirable in order to be able to start and operate the tightening device by electricity. Both these situations can constitute a stage in a possible collision process, but it is also possible that the collision can still be avoided.

In those cases where a desired warning is obtained there is normally no need to start the tightening device quickly, for example by pyrotechnics, but a continual electrical operation can ensure the required continual tightening throughout the whole duration of the collision. There should still, however, be the ability to start the tightening device quickly in those situations where no warning of a collision is received for some reason.

A preparatory tightening of this type means that the belt wearer is put in a better position before the collision and is therefore more likely to survive the collision without injury.

Yet another possibility is to carry out a gentle tightening before the said preparatory tightening which makes the belt wearer aware that his sitting position is not the best and should be changed to a position which is more inclined backwards. This can be carried out, for example, by increasing the abovementioned warning time further and initially carrying out the tightening at a lower force until the normal preparatory tightening state is reached, when the tightening force is increased in order to be able to handle a collision process in the way described above. This can be carried out, for example, by means of a suitable electrical control of an electric motor 19 which operates the tightening device. Another possibility is to have an arrangement so that putting on the safety belt results in a mechanism 20 being tensioned in the spooling device 3 and that after being triggered via a suitable sensor, for example the sensor 16, this mechanism brings about the required gentle tightening.

In the embodiment according to FIG. 1, the tightening takes place only in the part of the safety belt which passes over the user's shoulder, but other embodiments are also possible. It is, for example, possible to replace the fixing 8 with a spooling device 3 and thereby have the belt fastener 9 fixed on the safety belt. By this means, both the shoulder strap 6 and the lap strap 7 can be tightened by the operation of the tightening devices in both the spooling devices. The tightening can also be carried out only at the location of the fixing 8 with the safety belt passing freely through the belt fastener 9.

Figure 3:
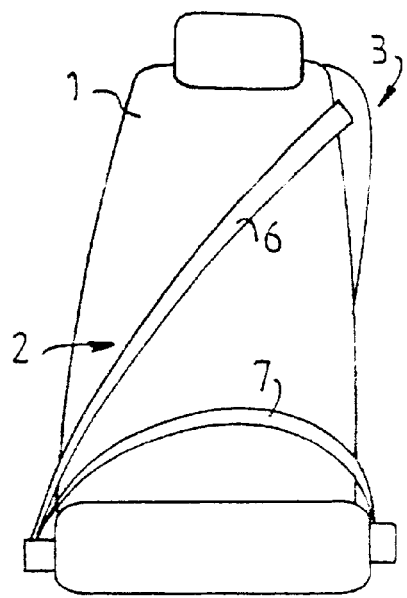
FIG. 3 shows an arrangement where the safety belt is attached to the vehicle seat.

Instead of fixing the safety belt 2 to the chassis of the vehicle, as shown in FIG. 1, it is of course also possible to fix the safety belt to the vehicle seat 1 in a known way and thus make the safety belt movable together with the vehicle seat and to fix one or more spooling devices to this. Such an embodiment is shown in FIG. 3.

In addition to the embodiments for three-point belts shown here there are of course other embodiments possible within the framework of this invention. Thus the concept of the invention can also be used for two-point and four-point belts.

In an alternative embodiment, a spooling device 3 can be located at the catch 10 and act upon this so that the tightening of the belt according to the invention can be achieved. In this case the catch 10 is designed with a spool section (not shown). In the event of such tightening the other ends of the belt are fixed.

It must of course be realized that the design and construction of the spooling device can vary within the framework of this invention. The rotating belt-tightening movement can also be replaced by a linear belt-tightening movement.

What is claimed is:

1. A method for restraining a belt wearer in a vehicle in the event of a collision by means of a safety belt comprising the steps of:
    reaching a predetermined retardation level for the vehicle;
    tightening the safety belt, wherein the step of tightening occurs for a period of at least 300 ms and begins after the beginning of the collision; and
    limiting a maximum pull on the safety belt to a predetermined value during a whole tightening process, wherein the limited maximum pull reduces a risk of injury to the belt wearer.

2. The method according to claim 1, wherein the step of tightening occurs for at least 800 ms.

3. The method according to claim 1, wherein the step of tightening comprises a tightening force that is at least as great as the limited maximum pull on the safety belt.

4. The method according to claim 1, wherein the limited maximum pull on the safety belt is within a range of 2.0 kN to 3.5 kN.

5. The method according to claim 1, wherein the step of tightening is preceded by a step of preparatory tightening which is initiated before the collision.

6. The method according to claim 5, wherein the step of preparatory tightening is initiated as a function of the retardation of the vehicle.

7. The method according to claim 5, wherein the step of preparatory tightening is initiated as a function of a distance to an object in front of the vehicle.

8. The method according to claim 5, wherein the step of preparatory tightening is continual and there is a continual transition into the step of tightening.

9. The method according to claim 5, wherein the step of preparatory tightening is preceded by a step of gentle tightening that is initiated as a function of the vehicle's driving situation with a lower tightening force than during the preparatory tightening.

10. The method according to claim 1, wherein the step of tightening is preceded by a step of gentle tightening that is initiated as a function of the vehicle's driving situation with a lower tightening force than during the step of tightening.

11. The method according to claim 1, wherein the step of tightening is carried out in a part of the safety belt which passes over a shoulder of the belt wearer.

12. A device for a safety belt in a vehicle, where the safety belt is acted upon by a tightening device and is arranged to be tightened around a belt wearer, comprising:
    a load-limiting device for limiting a maximum pull on the safety belt;
    wherein the tightening device can be activated in the event of a collision to tighten the safety belt and the tightening device is arranged to be able to operate for a period of at least 300 ms starting after the beginning of the collision and that the load-limiting device is arranged to operate between the belt and the tightening device.

13. The device according to claim 12, wherein the tightening device is arranged to be able to operate for at least 800 ms.

14. The device according to claim 12, wherein the tightening device is arranged to exert a tightening force which is at least as large as the maximum permitted pull on the safety belt.

15. The device according to claim 12, wherein the load-limiting device is a friction connection.

16. The device according to claim 12, wherein the tightening device is arranged to be able to tighten the safety belt at a speed of 5–10 m/s and to be able to wind up at least 140 mm of safety belt.

17. The device according to claim 15, wherein the load-limiting device is arranged to permit a maximum pull on the safety belt within a range of 2.0 kN to 3.5 kN.

18. The device according to claim 12, wherein the tightening device is initially operated by a gas.

19. The device according to claim 18, wherein the tightening device is operated by gas throughout the whole of its period of operation.

20. The device according to claim 12, wherein the tightening device comprises an electric motor.

21. The device according to claim 12, wherein the tightening device is activated before a collision, for a preparatory tightening.

22. The device according to claim 21, wherein the tightening device is activated as a function of a retardation of the vehicle.

23. The device according to claim 22, wherein a gentle tightening is activated as a function of a driving situation of the vehicle and the gentle tightening is performed with a lower force than during the preparatory tightening.

24. The device according to claim 21, wherein the tightening device is activated as a function of a distance to an object in front of the vehicle.

25. The device according to claim 21, wherein the tightening device is operated by electricity at least during the preparatory tightening.

26. The device according to claim 12, wherein the tightening device causes a gentle tightening as a function of the driving situation of the vehicle, wherein the gentle tightening comprises a lower force than during a main tightening.

27. The device according to any of claim 12, further comprising a part of the safety belt which passes over a shoulder of the belt wearer.

* * * * *